United States Patent
Cremer et al.

(10) Patent No.: US 7,056,102 B2
(45) Date of Patent: Jun. 6, 2006

(54) VIBRATION ISOLATING FUEL PUMP ASSEMBLY

(75) Inventors: Hugues Cremer, Bastogne (BE);
Michel Sanchez, Tellancourt (FR);
Manfred Schastok, Eltham (AU)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/728,105

(22) Filed: Dec. 4, 2003

(65) Prior Publication Data
US 2005/0058556 A1    Mar. 17, 2005

(30) Foreign Application Priority Data
Dec. 20, 2002    (EP) .................................. 02102855

(51) Int. Cl.
*F04B 17/03*    (2006.01)
(52) U.S. Cl. .................................. 417/363; 417/423.15
(58) Field of Classification Search ................ 417/363, 417/423.3, 423.15, 360; 248/638, 676
See application file for complete search history.

(56) References Cited

U.S. PATENT DOCUMENTS

| 4,752,058 A | * | 6/1988 | Weber .......................... 248/638 |
| 5,482,444 A | | 1/1996 | Coha et al. |
| 5,764,498 A | * | 6/1998 | Sundstrom ................... 361/809 |

FOREIGN PATENT DOCUMENTS

| DE | 4336574 | 5/1995 |
| EP | 0728937 | 8/1996 |
| EP | 0773362 | 5/1997 |

* cited by examiner

*Primary Examiner*—Charles G. Freay
(74) *Attorney, Agent, or Firm*—Jimmy L. Funke

(57) ABSTRACT

A vibration isolating fuel pump assembly comprises a stationary support (14) to be mounted in a fuel tank. An inner retainer (16) is fitted in the stationary support (14). The inner retainer (16) has a retainer body (18) and at least two flexible legs (20) extending substantially vertically and connected to the periphery of the retainer body (18), the upper ends of the flexible legs (20) being firmly supported by the stationary support (14) in the upper part thereof. A fuel pump (12) is received in the retainer body. Each flexible leg has its lower end connected to the retainer body via a resilient connecting element having a generally S-shape profile.

16 Claims, 2 Drawing Sheets

VIBRATION ISOLATING FUEL PUMP ASSEMBLY

FIELD OF THE INVENTION

The present invention generally relates to a vibration isolating fuel pump assembly.

BACKGROUND OF THE INVENTION

Such an assembly is, for example, known from U.S. Pat. No. 5,482,444, issued to Coha et al. in 1996, corresponding to EP-A-0 701 058. A plastic reservoir—providing a stationary support—is fixed to the bottom of a fuel tank. A generally cylindrical electric fuel pump is received in a plastic inner retainer, which is itself fitted in the plastic reservoir. The inner retainer is provided with two flexible legs extending vertically from its upper edge. These flexible legs are each provided at their upper end with a barb thereon, which engages in a notch in the reservoir to firmly attach the inner retainer to the reservoir. To minimise the transmission of vibrations of the fuel pump to the fuel tank, the fuel pump is surrounded by an elastic sleeve in the inner retainer. The elastic sleeve includes a plurality of small diameter elastic tubes, which extend longitudinally and are tangent to the sleeve. The small elastic tubes are integral with the elastic sleeve and are seated in corresponding channels in the inner retainer, whereby the resilient reactions of each of the elastic tubes on the fuel pump cooperate in suspending the fuel pump relative to the reservoir. Furthermore, vibratory excursions of the fuel pump are resiliently resisted by the elastic tubes, so that fuel pump vibrations are isolated from the reservoir.

SUMMARY OF THE INVENTION

The object of the present invention is to provide a simpler and cheaper vibration isolating fuel pump assembly.

A vibration isolating fuel pump assembly according to the present invention comprises a stationary support to be mounted in a fuel tank and an inner retainer fitted in the stationary support. The inner retainer has a retainer body and at least two flexible legs extending substantially vertically and connected to the retainer body, preferably to its periphery. The upper ends of the flexible legs are firmly supported by the stationary support in the upper part thereof. A fuel pump is received in the retainer body.

According to an important aspect of the invention, each leg has its lower end connected to the retainer body via a resilient S-shaped connecting element. Such an S-shaped connecting element provides a vibration decoupling structure, which allows damping the vibrations to which the electric pump is subject with regard to the stationary support when the motor vehicle is in operation. Contrary to known assemblies using rubber elements for reducing vibrations, the present invention uses the geometry of the inner retainer to minimise the transmission of vibrations of the fuel pump. As a result, the number of parts in the assembly is decreased, thereby simplifying its mounting and reducing costs.

The S-shaped element preferably comprises an interior portion on the periphery of the retainer body, an exterior portion connecting to the respective flexible leg and a central portion extending between opposite edges of the interior and exterior portions. It will be understood that due to its S-shape, the connecting element is capable of resiliently resisting movement of the inner portion (on the retainer body) in all directions with regard to the outer portion (joining the flexible leg). In other words, the radial and non-radial vibrations to which the fuel pump is subjected to will cause a resilient deformation of the S-shape element—by compression, stretching or twisting—thereby damping these vibrations and preventing their transmission to the stationary support and thus to the fuel tank. The dimensions and material of the connecting element are advantageously chosen in function of the resilience to be obtained (that is, in function of the damping effect to be achieved). For compactness, the S-shaped connecting elements are preferably horizontally arranged. However, they could also be vertically arranged or in an inclined manner.

To prevent severe compressions of the S-shaped connecting element that may be damaging, the interior portion advantageously has, on its side facing the exterior portion, a first rib. The exterior portion has, on its side facing the interior portion, a second rib coinciding with that of the interior portion in such a way that when the S-shaped element is compressed, these ribs come into abutment against said central portion in face-to-face relationship. These ribs allow reducing deformation of the connecting element under compression, which could lead to its rupture at the junctions between the central portion and the interior and exterior portions. Alternatively, the same effect can be obtained by providing ribs on opposite sides of the central portion. In case the S-shaped connecting element is horizontally arranged, the first and second ribs extend vertically.

The support preferably is a plastic reservoir that serves as fuel trap, so as to maintain a minimal level of fuel in the vicinity of a fuel inlet of the electric pump.

For an improved support of the inner retainer in the stationary support, the inner retainer is advantageously provided with three flexible legs.

The flexible legs may be evenly spaced around the inner retainer. However, it may be advantageous to arrange them at specific angles so that there is only one way of installing the inner retainer in the stationary support.

Since conventional electric fuel pumps generally have a cylindrical housing, the retainer body preferably is a cylindrical sleeve having an interior diameter substantially corresponding to the outer diameter of the pump housing. The retainer body further includes means for fixing the fuel pump received therein. In such a case, the S-shaped elements are each designed to follow the curvature of the retainer body.

In a preferred embodiment, each flexible leg is provided at its upper end with fixing means that cooperate with respective fixing means on the upper part of the stationary support. In order to reduce radial displacements of the pump in the reservoir, a retainer ring is mounted between the retainer body and the flexible legs, preferably at half the height of the flexible legs.

In another embodiment, a retainer ring is firmly supported in the upper part of the stationary support and the flexible legs are firmly supported by the retainer ring. This indirect fixing of the inner retainer to the stationary support provides a further damping effect.

It remains to be noted that the inner retainer is preferably integrally moulded in semi-rigid plastic material, such as e.g. polyoxymethylene (POM).

BRIEF DESCRIPTION OF THE DRAWINGS

The present invention will now be described, by way of example, with reference to the accompanying drawings, in which.

DETAILED DESCRIPTION OF A PREFERRED EMBODIMENT

Figure 1:
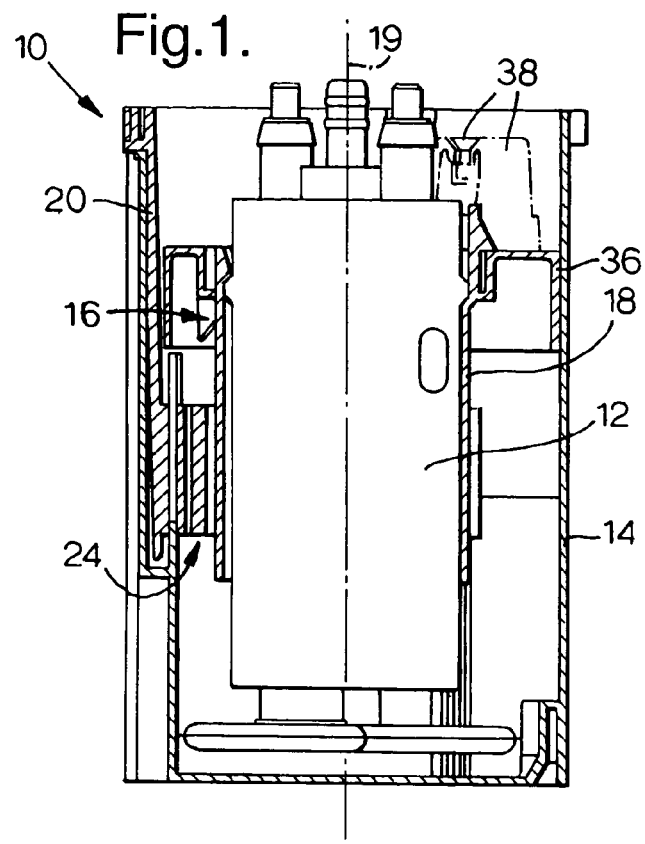
FIG. 1 is a partial vertical sectional view through a preferred embodiment of an assembly according to the invention.

FIG. 1 fragmentarily illustrates a preferred vibration isolating fuel pump assembly 10, which includes an electric fuel pump 12 mounted in a reservoir 14 providing a stationary support for the pump assembly. The reservoir 14, conventionally cup-shaped and made of plastic, is fixed to the bottom of a fuel tank (not shown) in a motor vehicle. Reference sign 16 indicates an integrally moulded inner retainer that is fitted in the reservoir 14. The inner retainer 16 has a body 18 in which the pump 12 is received. The fuel pump 12, which is disposed vertically in the retainer body 18 (see FIG. 1), generally has a cylindrical housing and includes an inlet at one end, a discharge at the other end and electric connections for its power supply. Due to the geometry of the fuel pump 12, the retainer body 18 is preferably formed as a cylindrical sleeve having an inner diameter essentially corresponding to the outer diameter of the pump housing.

The inner retainer 16 further includes three flexible legs 20 that extend substantially vertically from the periphery of the retainer body 18, the flexible legs 20 being spaced around the retainer body 18. The flexible legs 20 are supported in the upper part of the reservoir 14, so as to provide a suspended mounting of the pump 12 inside the reservoir 14. Therefore, each flexible leg 20 advantageously has at its upper end a fixing tab 21 with a barb 22 thereon, each fixing tab 21 fitting in a corresponding recess (not shown) in the upper part of the reservoir 14 in such a way that the barb 22 engages a notch in the recess. Regarding more precisely the spacing of flexible legs 20, they are preferably arranged in such a way that there is only one way of fitting the inner retainer 16 into the reservoir 14.

The assembly 10 is typically introduced in the fuel tank through an inspection opening to be mounted on the bottom of the fuel tank. The inspection opening is closed by a tank cover generally equipped with a fuel connector communicating inside the fuel tank with the pump outlet and outside the tank with the fuel supply line of the engine. Biasing means may also extend between the tank cover and reservoir 14 to urge the latter against the tank bottom.

During operation of the motor vehicle and/or the pump, the electric pump 12 is inevitably subject to vibrations that cause radial (that is, towards the inner walls of the reservoir 14) and/or axial (that is, along the longitudinal axis 19 of the reservoir 14) and/or rotational displacements thereof.

Figure 3:
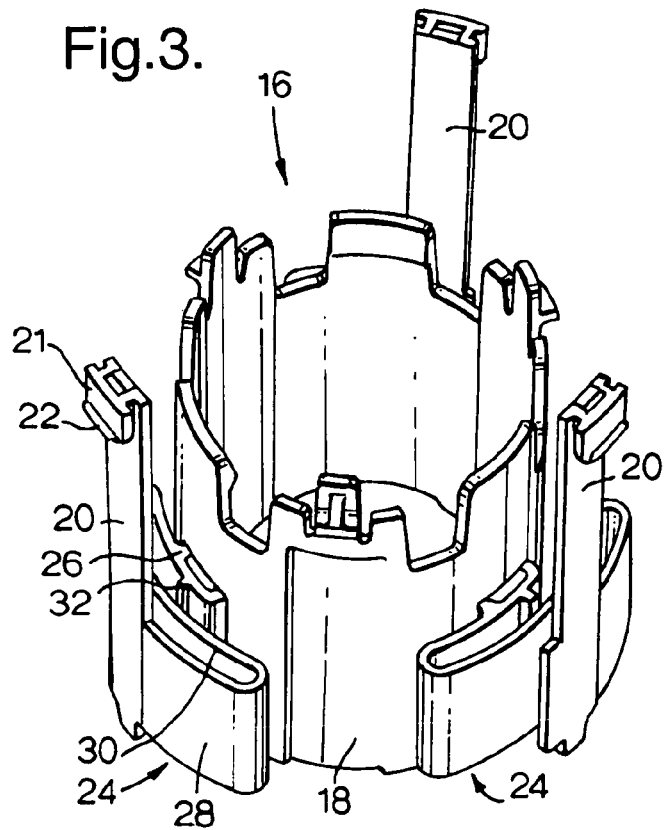
FIG. 3 is a perspective view of the inner retainer of FIG. 1.
Figure 4:
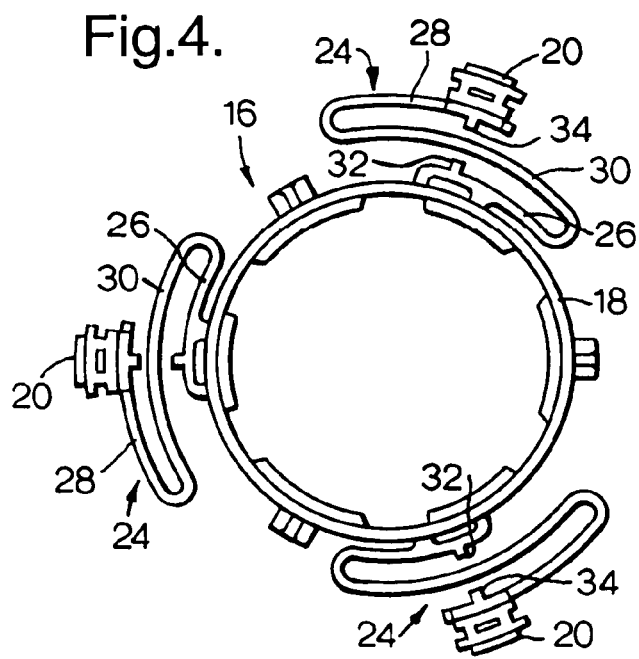
FIG. 4 is a top view of the inner retainer of FIG. 3.

It will be appreciated each flexible leg 20 has its lower end connected to the retainer body 18 via a resilient connecting element 24 having a generally S-shape profile. As can be best seen in FIGS. 3 and 4, the S-shaped element 24 is preferably horizontally arranged at the periphery of the retainer body 18. The S-shaped connecting element 24 has an interior portion 26 on the periphery of the retainer body 18, an exterior portion 28 connecting to the respective leg 20 and a central portion 30 extending between opposite edges of the interior 26 and exterior 28 portions. It will be understood that due to its S-shape, the connecting element 24 is capable of resiliently resisting movements of the inner portion 26 (on the retainer body 18) in all directions with regard to the outer portion 28 (joining the flexible leg 20). In other words, the radial and/or rotational and/or axial vibrations to which the fuel pump 12 is subjected to will cause a resilient deformation of the S-shape elements 24—by compression, stretching or twisting—thereby damping these vibrations and preventing their transmission to the reservoir 14 and thus to the fuel tank.

Furthermore, the length of the flexible legs 20 and the relatively low position of the connecting elements 24 on the retainer body 18 allows the pump 12 to have a good freedom of movement both in radial and axial directions. The flexible legs 20, which are preferably made of semi-rigid plastic, also absorb part of the vibrations generated by the electric pump 12.

To prevent rupture of the S-shaped elements 24 due to important compression (side load), the inner portion 26 is preferably provided on its side facing the exterior portion 28 with a vertical rib 32. The exterior portion 28 has on its side facing the inner portion 26 a vertical rib 34 coinciding with the rib 32 of the interior portion 26 in such a way that when the S-shaped element 24 is compressed, these ribs 32 and 34 come into abutment against the central portion 30 in face-to-face relationship. These ribs 32 and 34 are arranged in the central region of the S-shaped element 24 where the compression deformation would be maximal. These ribs 32, 34 thus limit compression deformation, and thereby avoid too much stress on the bent portions to prevent their rupture.

Figure 2:
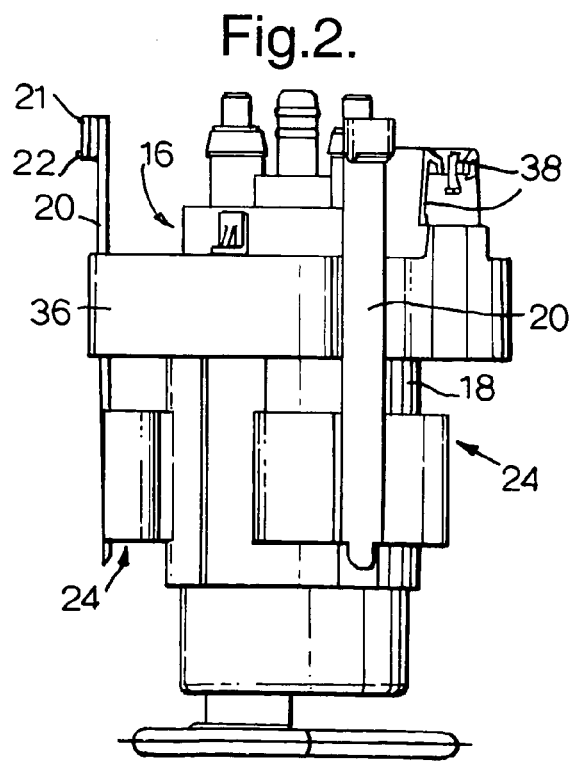
FIG. 2 is a side view of the inner retainer of FIG. 1 in which the pump is fitted.

In FIG. 2, reference sign 36 indicates a retainer ring that is fitted between the flexible legs 20 and the retainer body 18. This retainer ring 36 minimises radial displacements of the pump 12 in the reservoir 14. The retainer ring is further provided with fixing means 38 for wires and/or tubes in communication with the reservoir 14.

The inner retainer is preferably integrally moulded in a semi-rigid plastic material such as e.g. polyoxymethylene. The dimensions of the connecting elements 24 can be adapted to provide the desired resilience and damping effect.

The invention claimed is:

1. A vibration isolating fuel pump assembly comprising:
    a stationary support (14) to be mounted in a fuel tank;
    an inner retainer (16) fitted in said stationary support (14), said inner retainer (16) having a retainer body (18) and at least two flexible legs (20) extending substantially vertically and connected to said retainer body (18), the upper ends of said flexible legs (20) being firmly supported by said stationary support (14) in the upper part thereof; and
    a fuel pump (12) received in said retainer body (18);
    characterised in that each flexible leg (20) has its lower end connected to said retainer body (18) via a resilient connecting element (24) having a generally S-shape profile.

2. The assembly according to claim 1, characterised in that said S-shaped connecting element (24) has an S-shape in a horizontal plane.

3. The assembly according to claim 1, characterised in that said S-shaped connecting element (24) has:
    an interior portion (26) on the periphery of said retainer body (18); an exterior portion (28) connecting to the respective leg (20); and
    a central portion (30) extending between opposite edges of said interior (26) and exterior (28) portions.

4. The assembly according to claim 3, characterised in that said interior portion (26) has, on its side facing the exterior portion (28), a first rib (32); and said exterior portion (28) has, on its side facing the interior portion (26), a second rib (34) coinciding with that of the interior portion (26) in such a way that when said S-shaped element (24) is compressed, said ribs (32, 34) come into abutment against said central portion (30) in face-to-face relationship.

5. The assembly according to claim 4, characterised in that first and second ribs (32, 34) extend vertically.

6. The assembly according to claim 1, characterised in that said retainer body (18) is a cylindrical sleeve having an inner diameter essentially corresponding to the outer diameter of a cylindrical pump housing; and said retainer body (18) is provided with means for fixing said fuel pump (12) received therein.

7. The assembly according to claim 6, characterised in that each S-shaped connecting element (24) is designed to follow the curvature of said retainer body (18).

8. The assembly according to claim 1, characterised by three flexible legs (20).

9. The assembly according to claim 1, characterised in that said flexible legs are arranged at specific angles around said inner retainer so that there is only one way of installing said inner retainer in said stationary support.

10. The assembly according to claim 1, characterised in that said flexible legs (20) are evenly spaced around said inner retainer (16).

11. The assembly according to claim 1, characterised in that each flexible leg (20) is provided at its upper end with fixing means that cooperate with respective fixing means on the upper part of said stationary support (14).

12. The assembly according to claim 1, characterised by a retainer ring (36) that is mounted between said retainer body (18) and said flexible legs (20).

13. The assembly according to claim 12, characterised in that said retainer ring (36) is arranged at half the height of said flexible legs (20).

14. The assembly according to claim 1, characterised in that a retainer ring is firmly supported in the upper part of said stationary support; and said flexible legs are firmly supported by said retainer ring.

15. The assembly according to claim 1, characterised in that said stationary support (14) is a plastic reservoir.

16. The assembly according to claim 1, characterised in that said inner retainer (16) is integrally moulded in semi-rigid plastic material.

* * * * *